(12) United States Patent
Azuma et al.

(10) Patent No.: US 7,346,513 B2
(45) Date of Patent: Mar. 18, 2008

(54) AUDIO SIGNAL SAVING OPERATION CONTROLLING METHOD, PROGRAM THEREOF, RECORD MEDIUM THEREOF, AUDIO SIGNAL REPRODUCING OPERATION CONTROLLING METHOD, PROGRAM THEREOF, RECORD MEDIUM THEREOF, AUDIO SIGNAL INPUTTING OPERATION CONTROLLING METHOD, PROGRAM THEREOF, AND RECORD MEDIUM THEREOF

(75) Inventors: Takafumi Azuma, Tokyo (JP); Hideharu Fujiyama, Chiba (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 10/114,001

(22) Filed: Apr. 1, 2002

(65) Prior Publication Data
US 2002/0156637 A1    Oct. 24, 2002

(30) Foreign Application Priority Data
Apr. 3, 2001    (JP)    ............................. 2001-104539

(51) Int. Cl.
G06F 15/16    (2006.01)
G10L 11/00    (2006.01)
G10L 19/00    (2006.01)

(52) U.S. Cl. .................... 704/270.1; 704/201; 704/501; 709/200

(58) Field of Classification Search ............. 704/270.1; 709/204; 381/77; 710/20
See application file for complete search history.

(56) References Cited

U.S. PATENT DOCUMENTS 5,434,943 A * 7/1995 Dentai et al. ............... 385/129
5,557,724 A * 9/1996 Sampat et al. ................ 725/43
5,703,764 A * 12/1997 Hermann et al. ........ 363/21.16
5,710,591 A * 1/1998 Bruno et al. ............. 348/14.09
5,765,164 A * 6/1998 Prasad et al. ............. 707/104.1

(Continued)

OTHER PUBLICATIONS

"Total Recorder Review", Feb. 13, 2000, Available at: http://html.megalink.com/artist/reviews/totalrecorder.html.*

(Continued)

*Primary Examiner*—David Hudspeth
*Assistant Examiner*—Brian L. Albertalli
(74) *Attorney, Agent, or Firm*—Frommer Lawrence & Haug LLP; William S. Frommer; Thomas F. Presson

(57) ABSTRACT

A method that allows two or more APs (application programs) to use a sound card and an AP to select an input device of the sound card regardless of a mixer device of the sound card is disclosed.

A connecting module 31 is disposed among a sound card 17, a HDD 13, and an NIC 19. Switches 32 and 33 are disposed in parallel to the connecting module 31. In other words, an audio signal that is input form the sound card 17 is supplied to the NIC 19 through the switch 32. In addition, the audio signal is supplied to the HDD 13 through the switch 33. The switch 32 is equivalent to a concept of an application interface for starting and stopping a sending operation for an audio signal supplied from the sound card 17 to the network 111. The switch 33 is equivalent to a concept of an application interface for starting and stopping a saving operation for an audio signal supplied from the sound card 17 to the HDD 13.

15 Claims, 13 Drawing Sheets

U.S. PATENT DOCUMENTS

| | | | | |
|---|---|---|---|---|
| 6,009,519 | A * | 12/1999 | Jones et al. | 713/1 |
| 6,175,822 | B1 * | 1/2001 | Jones | 704/270 |
| 6,275,805 | B1 * | 8/2001 | Fado et al. | 704/270 |
| 2002/0114610 | A1 * | 8/2002 | Nakano et al. | 386/39 |
| 2002/0196941 | A1 * | 12/2002 | Isaacson et al. | 380/231 |

OTHER PUBLICATIONS

"Diverting the Audio Stream", Jan. 2001, Available at: http://wired-vig.wired.com/wired/archive/9.01/streetcred.html?pg=4.*

"Total Recorder 3.0.1", Jan. 13, 2001, Available at: http://tucows.comunitel.net/winme/preview/136779.html.*

"Record Streaming Audio", Nov. 2, 2001, Available at: http://www.g4tv.com/techvvault/features/20209/How_to_Capture_an_Audio_Stream.html.*

"High Criteria: Specialty Recording Software", Jan. 24, 2002, Available at: http://streamingmediaworld.com/audio/docs/total.*

"High Criteria News", Available at: www.highcriteria.com/main_news.htm.*

Makino et al., "Hybrid audio coding for speech and audio below medium bit rate", International Conference on Consumer Electronics, Digest of Technical Papers, Jun. 13-15, 2000, pp. 264-265.*

Sound Card Mixer. In Wikipedia, The Free Encyclopedia. Retrieved Jun. 4, 2007, from http://en.wikipedia.org/wiki/Sound_card_mixer.*

Makino et al., "Hybrid Audio Coding", Sony Research Forum 99, Feb. 2000.*

* cited by examiner

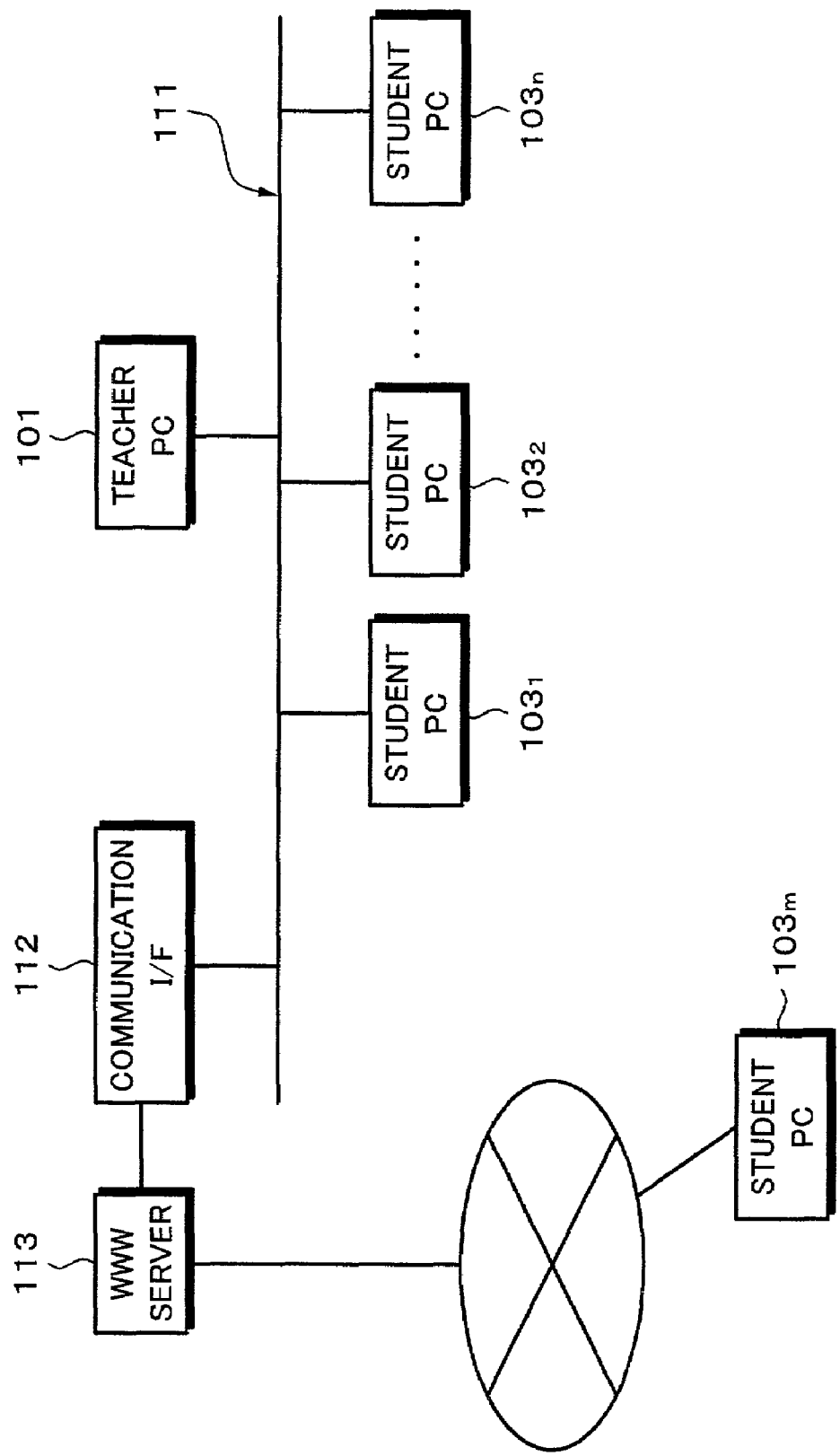

AUDIO SIGNAL SAVING OPERATION CONTROLLING METHOD, PROGRAM THEREOF, RECORD MEDIUM THEREOF, AUDIO SIGNAL REPRODUCING OPERATION CONTROLLING METHOD, PROGRAM THEREOF, RECORD MEDIUM THEREOF, AUDIO SIGNAL INPUTTING OPERATION CONTROLLING METHOD, PROGRAM THEREOF, AND RECORD MEDIUM THEREOF

BACKGROUND OF THE INVENTION

1. Field of the Invention

The present invention relates to an audio signal saving operation controlling method, a program thereof, a record medium thereof, an audio signal reproducing operation controlling method, a program thereof, a record medium thereof, an audio signal reproducing operation controlling method, a program thereof, a record medium thereof, an audio signal inputting operation controlling method, a program thereof, and a record medium thereof that cause a computer to simultaneously input and output an audio signal.

2. Description of the Related Art

A lecture system shown in FIG. 1 is known. Referring to FIG. 1, in the lecture system, a teacher PC (Personal Computer) 101 and student PCs $103_1$, $103_2$, . . . and $103_n$ (they are generally referred to as student PC 103) are connected through a network 111 so as to share materials thereamong and exchange questions as files thereamong.

Such a system has four audio signal communication function modes that are ALLCALL mode, INCOME mode, MONITOR mode, and MODEL mode. In the ALLCALL mode, the teacher speaks to all the students or causes them to listen to an audio signal of a CD or a file in a predetermined format. In the INCOME mode, the teacher speaks to only his or her designated student. In the MONITOR mode, while each student listens to an example pronunciation sound, he or she practices corresponding thereto and records his or her pronunciation sound (DRILL mode) and the teacher monitors the recorded sound of each student. In the MODEL mode, the teacher causes all the students to listen to a pronunciation sound of his or her designated student or an audio signal of a CD or a file in the predetermined format.

In the system shown in FIG. 1, an analog line is used as the network 111 for the audio signal communication functions. As analog systems have been changed to digital systems, the ALLCALL mode, the INCOME mode, and the MODEL mode have been accomplished as digital systems. Although the DRILL mode of which each student practices corresponding to an example pronunciation sound and records his or her pronunciation sound has been accomplished as a digital system, the MONITOR mode of which the teacher monitors the recorded sound of each student has not been accomplished as a digital system.

This is because although a sound card that a PC requires to record and reproduce an audio signal cannot be simultaneously used by two or more APs (Application Programs as software), an AP that records an audio signal and an AP that sends an audio signal through the network have been separately developed.

In reality, as shown in FIG. 2, in the DRILL mode, while each student is listening to an example pronunciation sound recorded in a HDD 124, his or her pronunciation sound is recorded to the HDD 124. At that point, a terminal 123b of a switch 123 is selected in a connecting module 122. When the DRILL mode is switched to the MONITOR mode, since the terminal 123b of the switch 123 has been selected, it is necessary to select the terminal 123a to send the pronunciation sound to the teacher PC 101. In other words, the saving operation for the pronunciation sound of the student should be stopped. In such a manner, the AP is designed.

In addition, it is impossible to simultaneously receive an audio signal from the network 111 and reproduce the audio signal from the HDD 124 while saving it thereto. Alternatively, it is impossible to simultaneously send an audio signal to the network 111 while reproducing the audio signal.

Likewise, when an audio signal is steam-distributed on the network, since an audio signal to be reproduced is not present in a local PC, it is impossible to record the audio signal while it is being reproduced.

As an OS (Operating System) that operates a PC, Microsoft Windows Operating System (registered trademark) distributed by Microsoft Corporation (hereinafter referred to as Windows) has been widely used. In a PC to which Windows has been installed, an inputting device of a sound card is selected by a volume controller of Windows or a dedicated mixer.

As information with which the AP side controls a mixer device, a component type has been defined on the AP side. However, since the component type of the mixer device depends on each manufacturer, there is a possibility of which the AP side cannot control a desired device.

In reality, when a signal of which all outputs of inputting devices are mixed is obtained (the resultant signal is referred to as MIX signal), with the structure of a mixer device 134 shown in FIG. 3, the MIX signal can be obtained by turning on all switches 135, 136, and 137. In contrast, with the structure of a mixer device 144 shown in FIG. 4, since the component type of the MIX terminal from which the MIX signal is obtained is uncertain, the MIX signal cannot be obtained.

OBJECTS AND SUMMARY OF THE INVENTION

An object of the present invention is to provide an audio signal saving operation controlling method, a program thereof, a record medium thereof, an audio signal reproducing operation controlling method, a program thereof, a record medium thereof, an audio signal inputting operation controlling method, a program thereof, and a record medium thereof that allow two or more APs to use one sound card and an AP to select an inputting device of a sound card regardless of a mixer device of the sound card.

A first aspect of the present invention is an audio signal saving operation controlling method for causing an application program to control a sending operation and a saving operation for an audio signal, the application program being installed in a computer that is equipped with a sound card and a network interface card, the method comprising the steps of starting the sending operation for the audio signal to the network, when a send start method for starting the sending operation for the audio signal to a network is called from the application program installed in the computer, stopping the sending operation for the audio signal to the network, when a send stop method for stopping the sending operation for the audio signal to the network is called from the application program, starting the saving operation for the audio signal to a record medium, when a save start method for starting the saving operation for the audio signal to the record medium is called from the application program, and stopping the saving operation for the audio signal to the record medium, when a save stop method for stopping the saving operation for the audio signal to the record medium is called from the application program, wherein the audio signal is saved to the record medium without need to interrupt the sending operation for the audio signal to the network, and wherein the audio signal is sent to the network without need to interrupt the saving operation for the audio signal to the record medium.

A second aspect of the present invention is an audio signal reproducing operation controlling method for causing an application program to control a receiving operation, a reproducing operation, and a saving operation for an audio signal, the application program being installed in a computer that is equipped with a sound card, the method comprising the steps of starting the receiving operation and the reproducing operation for the audio signal, when a receive and reproduction start method for starting the receiving operation and the reproducing operation for the audio signal is called from the application program installed in the computer, stopping the receiving operation and the reproducing operation for the audio signal, when a receive and reproduction stop method for stopping the receiving operation and the reproducing operation for the audio signal is called from the application program, starting the saving operation for the audio signal to a record medium, when a save start method for starting the saving operation for the audio signal to the record medium is called from the application program, and stopping the saving operation for the audio signal to the record medium, when a save stop method for stopping the saving operation for the audio signal to the record medium is called from the application program, wherein the audio signal is saved to the record medium without need to interrupt the receiving operation and the reproducing operation for the audio signal, and wherein the audio signal is received and reproduced without need to interrupt the saving operation for the audio signal to the record medium.

A third aspect of the present invention is an audio signal inputting operation controlling method for causing an application program to control an inputting operation and an outputting operation of a sound card, the application program being installed in a computer, the method comprising the steps of detecting a component type of the sound card, and recording the detected component type to an information file, wherein when the application program controls the inputting operation and the outputting operation, the information file is referenced.

A fourth aspect of the present invention is an audio signal saving operation controlling program for causing an application program to control a sending operation and a saving operation for an audio signal, the application program being installed in a computer that is equipped with a sound card and a network interface card, the controlling program comprising a means for starting the sending operation for the audio signal to the network, when a send start method for starting the sending operation for the audio signal to a network is called from the application program installed in the computer, a means for stopping the sending operation for the audio signal to the network, when a send stop method for stopping the sending operation for the audio signal to the network is called from the application program, a means for starting the saving operation for the audio signal to a record medium, when a save start method for starting the saving operation for the audio signal to the record medium is called from the application program, and a means for stopping the saving operation for the audio signal to the record medium, when a save stop method for stopping the saving operation for the audio signal to the record medium is called from the application program, wherein the audio signal is saved to the record medium without need to interrupt the sending operation for the audio signal to the network, and wherein the audio signal is sent to the network without need to interrupt the saving operation for the audio signal to the record medium.

A fifth aspect of the present invention is an audio signal reproducing operation controlling program for causing an application program to control a receiving operation, a reproducing operation, and a saving operation for an audio signal, the application program being installed in a computer that is equipped with a sound card, the controlling program comprising a means for starting the receiving operation and the reproducing operation for the audio signal, when a receive and reproduction start method for starting the receiving operation and the reproducing operation for the audio signal is called from the application program installed in the computer, a means for stopping the receiving operation and the reproducing operation for the audio signal, when a receive and reproduction stop method for stopping the receiving operation and the reproducing operation for the audio signal is called from the application program, a means for starting the saving operation for the audio signal to a record medium, when a save start method for starting the saving operation for the audio signal to the record medium is called from the application program, and a means for stopping the saving operation for the audio signal to the record medium, when a save stop method for stopping the saving operation for the audio signal to the record medium is called from the application program, wherein the audio signal is saved to the record medium without need to interrupt the receiving operation and the reproducing operation for the audio signal, and wherein the audio signal is received and reproduced without need to interrupt the saving operation for the audio signal to the record medium.

A sixth aspect of the present invention is an audio signal inputting operation controlling program for causing an application program to control an inputting operation and an outputting operation of a sound card, the application program being installed in a computer, the controlling program comprising a means for detecting a component type of the sound card, and a means for recording the detected component type to an information file, wherein when the application program controls the inputting operation and the outputting operation, the computer is operated so that the information file is referenced.

A seventh aspect of the present invention is a record medium on which an audio signal saving operation controlling program has been recorded, the controlling program causing an application program to control a sending operation and a saving operation for an audio signal, the application program being installed in a computer that is equipped with a sound card and a network interface card, the controlling program comprising a means for starting the sending operation for the audio signal to the network, when a send start method for starting the sending operation for the audio signal to a network is called from the application program installed in the computer, a means for stopping the sending operation for the audio signal to the network, when a send stop method for stopping the sending operation for the audio signal to the network is called from the application program, a means for starting the saving operation for the audio signal to the record medium, when a save start method for starting the saving operation for the audio signal to the record medium is called from the application program, and a means for stopping the saving operation for the audio signal to the record medium, when a save stop method for stopping the saving operation for the audio signal to the record medium is called from the application program, wherein the audio signal is saved to the record medium without need to interrupt the sending operation for the audio signal to the network, and wherein the audio signal is sent to the network without need to interrupt the saving operation for the audio signal to the record medium.

An eighth aspect of the present invention is a record medium on which an audio signal reproducing operation controlling program has been saved, the controlling program causing an application program to control a receiving operation, a reproducing operation, and a saving operation for an audio signal, the application program being installed in a computer that is equipped with a sound card, the controlling program comprising a means for starting the receiving operation and the reproducing operation for the audio signal, when a receive and reproduction start method for starting the receiving operation and the reproducing operation for the audio signal is called from the application program installed in the computer, a means for stopping the receiving operation and the reproducing operation for the audio signal, when a receive and reproduction stop method for stopping the receiving operation and the reproducing operation for the audio signal is called from the application program, a means for starting the saving operation for the audio signal to the record medium, when a save start method for starting the saving operation for the audio signal to the record medium is called from the application program, and a means for stopping the saving operation for the audio signal to the record medium, when a save stop method for stopping the saving operation for the audio signal to the record medium is called from the application program, wherein the audio signal is saved to the record medium without need to interrupt the receiving operation and the reproducing operation for the audio signal, and wherein the audio signal is received and reproduced without need to interrupt the saving operation for the audio signal to the record medium.

A ninth aspect of the present invention is a record medium on which an audio signal inputting operation controlling program has been recorded, the controlling program causing an application program to control an inputting operation and an outputting operation of a sound card, the application program being installed in a computer, the controlling program comprising a means for detecting a component type of the sound card, and a means for recording the detected component type to an information file, wherein when the application program controls the inputting operation and the outputting operation, the computer is operated so that the information file is referenced.

When a send start method for starting the sending operation for the audio signal to a network is called from the application program installed in the computer, the sending operation for the audio signal to the network is started. When a send stop method for stopping the sending operation for the audio signal to the network is called from the application program, the sending operation for the audio signal to the network is stopped. When a save start method for starting the saving operation for the audio signal to the record medium is called from the application program, the saving operation for the audio signal to a record medium is started. When a save stop method for stopping the saving operation for the audio signal to the record medium is called from the application program, the saving operation for the audio signal to the record medium is stopped. The audio signal is saved to the record medium without need to interrupt the sending operation for the audio signal to the network. The audio signal is sent to the network without need to interrupt the saving operation for the audio signal to the record medium. Likewise, the audio signal is saved to the record medium without need to interrupt the receiving operation and the reproducing operation for the audio signal. The audio signal is received and reproduced without need to interrupt the saving operation for the audio signal to the record medium. A component type of the sound card is detected. The detected component type is recorded to an information file. When the application program controls the inputting operation and the outputting operation, the information file is referenced.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 20 is a schematic diagram showing an example of the system according to the present invention.

DETAILED DESCRIPTION OF THE PREFERRED EMBODIMENTS

Figure 5:
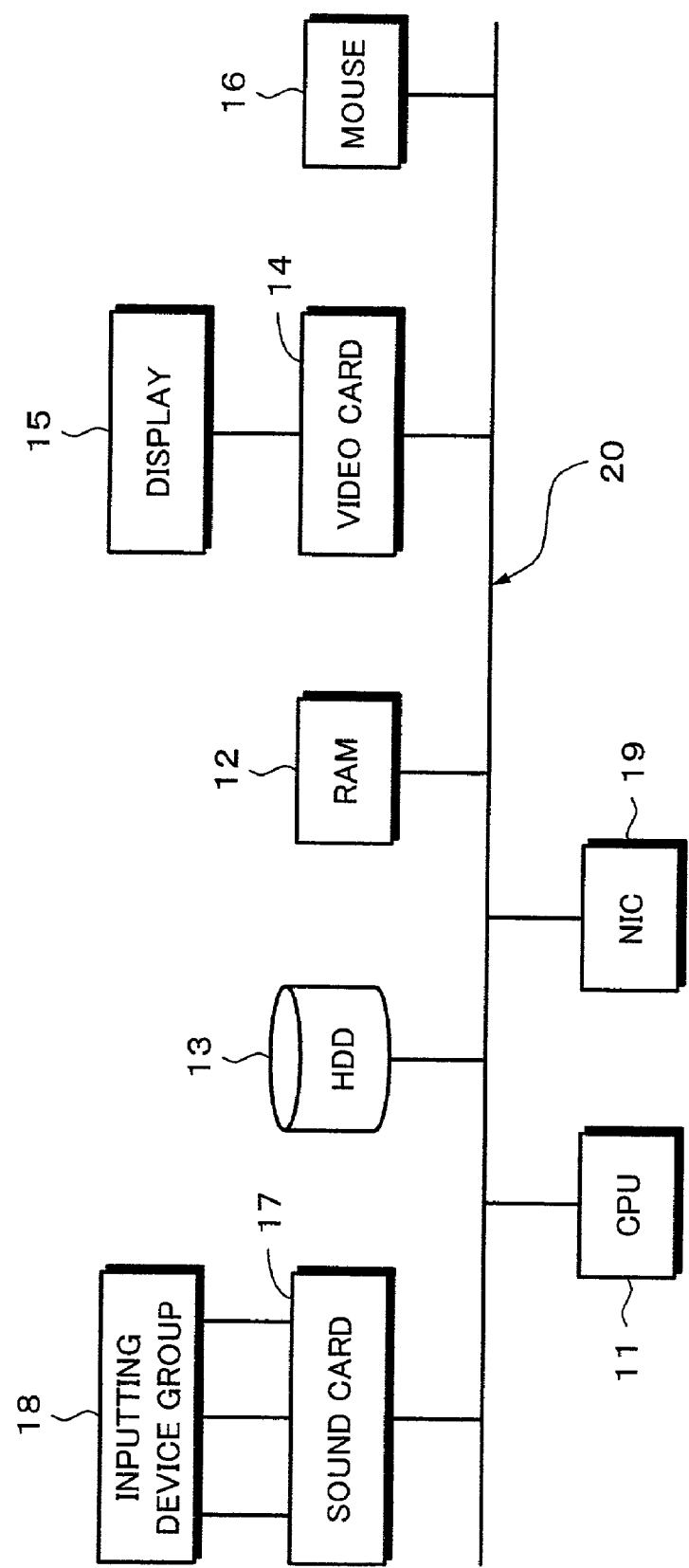
FIG. 5 is a block diagram for explaining a PC according to the present invention.

Next, with reference to the accompanying drawings, embodiments of the present invention will be described. For simplicity, in each drawing, similar portions are denoted by similar reference numerals and redundant description will be omitted. First of all, with reference to FIG. 5, an example of a PC according to an embodiment of the present invention will be described. Referring to FIG. 5, the PC is composed of a CPU (Central Processing Unit) 11, a RAM (Random Access Memory) 12, a HDD (Hard Disk Drive) 13, a video card 14, a sound card 17, a mouse 16, and an NIC (Network Interface Card) 19. The CPU 11, the RAM 12, the HDD 13, the video card 14, the mouse 16, the sound card 17, and the NIC 19 that compose the PC are connected through a bus 20.

The RAM 12 is a record medium with which the CPU 11 performs arithmetic operations. An OS that causes the PC to operate, an AP, and so forth have been installed to the HDD 13. A display 15 is connected to the video card 14. The mouse 16 is used as a pointing device on the OS or the AP. A microphone, a CD player, and/or an inputting device group 18 that output audio signals are connected to the sound card 17. The NIC 19 is used to connect the PC to a network 111.

Figure 6:
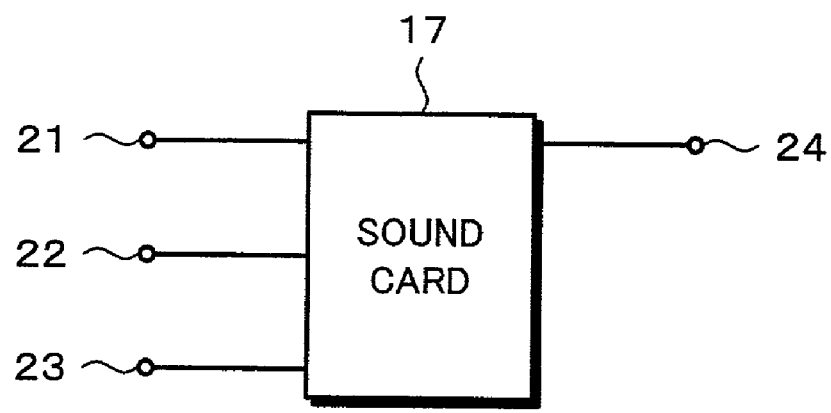
FIG. 6 is a schematic diagram for explaining a sound card according to the present invention.

FIG. 6 shows an example of the sound card 17. A plurality of input terminals 21, 22, and 23 are disposed on the sound card 17. For example, an output of the microphone is supplied to the input terminal 21. An output of the CD player is supplied to the input terminal 22. Data in a predetermined format is supplied to the input terminal 23. In other words, predetermined signals are supplied to those terminals. Data in a predetermined format is output from an output terminal 24. The data in the predetermined format that is output from the output terminal 24 can be returned to the input terminal 23. Alternatively, the data that is output from the output terminal 24 can be returned to the input terminal 23. In the example of the sound card 17 shown in FIG. 6, the sound card has three input terminals and one output terminal. However, it should be noted that the number of input terminals and/or the number of output terminals are not limited.

Figure 7:
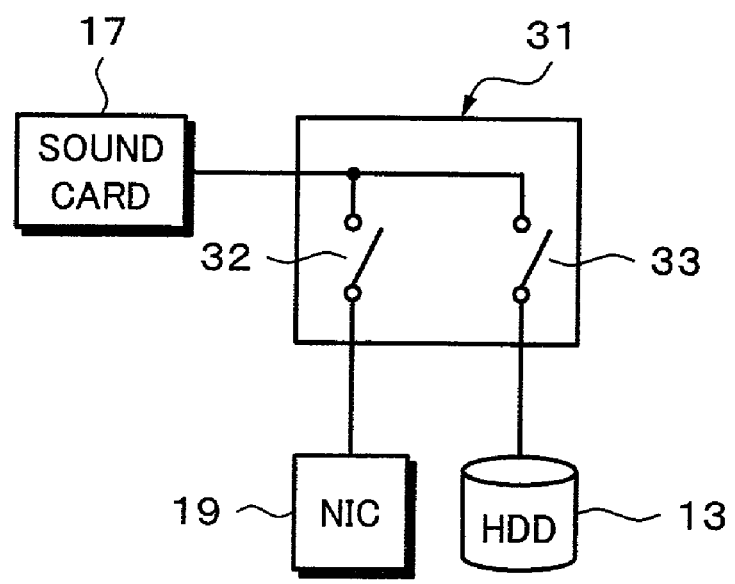
FIG. 7 is a schematic diagram for explaining a connecting module according to a first embodiment of the present invention.

FIG. 7 is a schematic diagram showing a connecting module according to a first embodiment of the present invention. According to the first embodiment, a connecting module 31 is disposed among the sound card 17, the HDD 13, and the NIC 19. Switches 32 and 33 are disposed in parallel on the connecting module 31 so that the switches 32 and 33 are connected to the NIC 19 and the HDD 13, respectively. In other words, an audio signal that is input from the sound card 17 is supplied to the NIC 19 through the switch 32. In addition, the audio signal is supplied to the HDD 13 through the switch 33.

In this example, the switch 32 of the connecting module 31 is equivalent to a concept of an application interface (hereinafter referred to as method) for starting and stopping a sending operation for an audio signal supplied from the sound card 17 to the network 111. For example, when the sending operation of the audio signal is started, a send start method SendStart is called from the AP. When the sending operation of the audio signal is stopped, a send stop method SendStop is called from the AP. In other words, when the send start method SendStop is called from the AP, the switch 32 is turned on. When the send stop method SendStop is called from the AP, the switch 32 is turned off. Before the sending operation is performed, it is necessary to call for example a method SetAddress so as to set the sending destination.

The switch 33 of the connecting module 31 is equivalent to a concept of a method for starting and stopping a saving operation for an audio signal supplied from the sound card 17 to the HDD 13. For example, when the saving operation of an audio signal to the HDD 13 is started, a save start method SaveStart is called from the AP. When the saving operation is stopped, a save stop method SaveStop is called from the AP. In other words, when the save start method SaveStart is called from the AP, the switch 33 is turned on. When the save stop method SaveStop is called from the AP, the switch 33 is turned off.

The audio signal supplied to the HDD 13 is saved. The audio signal supplied to the NIC 19 is sent to a desired PC through the network 111. In other words, the switch 32 and the switch 33 are connected to the connecting module 31 in parallel so that the saving operation and the sending operation can be independently and simultaneously performed.

Figure 8:
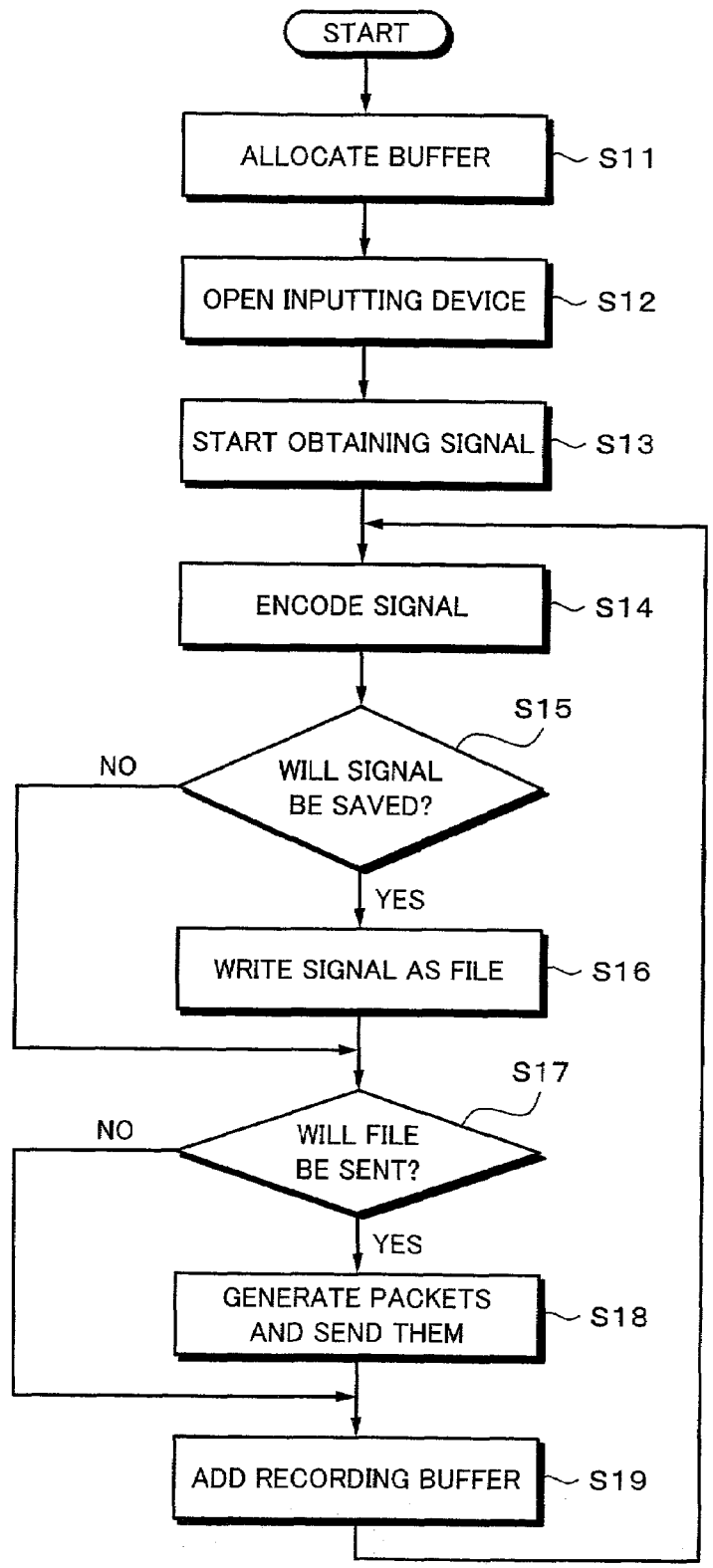
FIG. 8 is a flow chart for explaining the operation of the connecting module according to the first embodiment of the present invention.

Next, with reference to a flow chart shown in FIG. 8, the operation of the connecting module according to the first embodiment will be described. When the send start method (SendStart) and/or the save start method (SaveStart) is called from the AP, the operation corresponding to the flow chart is started. In other words, a thread is generated. Thereafter, at step S11, a buffer that saves data is allocated and initialized. At that point, when the process speed of the CPU 11 is slow, to assure the sending operation in real time, the number of buffers is increased. At step S12, in the input device group 18, a device to which a signal is supplied is opened. At step S13, a thread for obtaining and processing a signal supplied from the opened device is generated. At step S14, whenever one buffer is filled with the signal, it is encoded.

At step S15, it is determined whether or not the method called from the AP is the save start method. When the determined result represents that the save start method has been called, the flow advances to step S16. In contrast, when the determined result represents that the save start method has been called, the flow advances to step S17. At step S16, the obtained signal is saved as a file to the HDD 13.

At step S17, it is determined whether or not the method called from the AP is the send start method. When the determined result represents that the send start method has been called, the flow advances to step S18. In contrast, when the determined result represents that the send start method has not been called, the flow advances to step S19. At step S18, packets are generated with the obtained signal. The generated packets are sent from the NIC 19. At step S19, a buffer is added. Thereafter, the flow returns to step S14.

When the send stop method (SendStop) and/or the save stop method (SaveStop) is called from the AP, the receiving operation for the signal supplied from the device and the process therefor are stopped. Thereafter, the allocated buffers are unallocated.

In such a manner, the sending operation for a signal to the network 111 can be started and stopped without need to interrupt the saving operation for the signal. In addition, while a signal is being sent to the network 111, the saving operation for the signal can be started and stopped without need to interrupt the sending operation of the signal.

Figure 9:
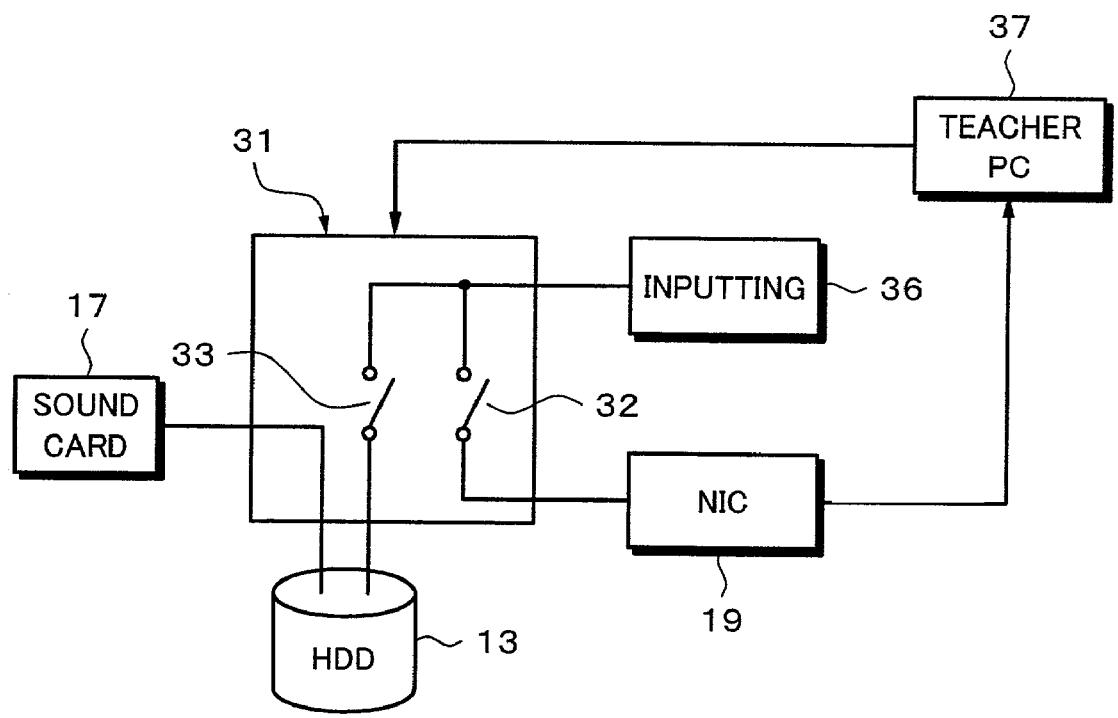
FIG. 9 is a schematic diagram for explaining a real example of the connecting module according to the first embodiment of the present invention.

FIG. 9 shows an application of the connecting module according to the first embodiment. An audio signal is supplied from an inputting portion 36 to a connecting module 31. When the send start method for the connecting module 31 is called from the AP of a teacher PC 37, a switch 32 is turned on. Thus, the audio signal supplied from the inputting portion 36 is supplied to an NIC 19. Packets are generated with the audio signal supplied to the NIC 19. The generated packets are supplied to the teacher PC 37. When the save start method for the connecting module 31 is called from the AP of the teacher PC 37, the switch 33 is turned on. As a result, the audio signal supplied from the inputting portion 36 is saved as a file to an HDD 13. The file of the audio signal saved in the HDD 13 is supplied to a sound card 17. The sound card 17 reproduces the audio signal of the file.

In other words, as was described above, the sound of the a student is supplied from the inputting portion 36. When the send start method and the save start method are called from the AP of the teacher PC 37, the sound of the student is saved as a file to the HDD 13. The sound card 17 reproduces the saved file. At that point, the teacher PC 37 can listen to the sound of the student.

Figure 10:
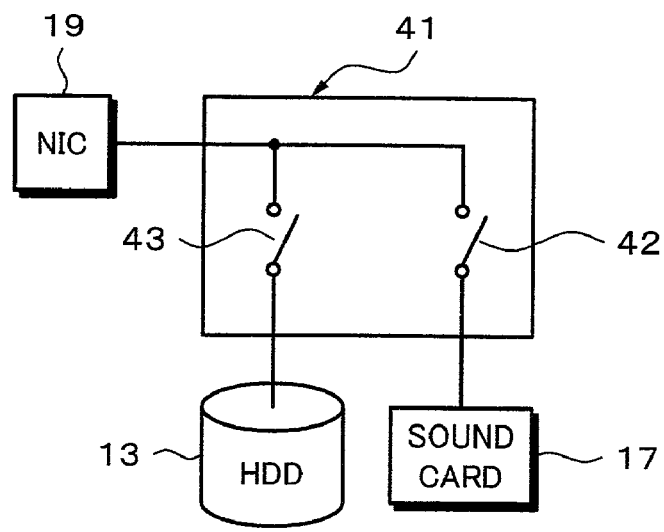
FIG. 10 is a schematic diagram for explaining a first example of a connecting module according to a second embodiment of the present invention.

FIG. 10 is a schematic diagram showing a first example of a connecting module according to a second embodiment of the present invention. In the first example shown in FIG. 10, a connecting module 41 is disposed among an NIC 19, a HDD 13, and a sound card 17. Switches 42 and 43 are connected in parallel to the connecting module 41. In other words, an audio signal supplied from the NIC 19 is supplied to the sound card 17 through the switch 42. In addition, the audio signal is supplied to the HDD 13 through the switch 43.

In this example, the switch 42 of the connecting module 41 is equivalent to a concept of a method for starting and stopping a receiving operation and a reproducing operation of the sound card 17 for an audio signal supplied from the NIC 19. For example, when the sound card 17 receives an audio signal and reproduces the audio signal, a receive and reproduction start method RecvStart is called from the AP. When the receiving operation and the reproducing operation are stopped, a receive and reproduction stop method RecvStop is called from the AP. In other words, when the receive and reproduction start method RecvStart is called from the AP, the switch 42 is turned on. When the receive and reproduction stop method RecvStop is called from the AP, the switch 42 is turned off. Before the receiving operation is performed, when for example a method SetMultiAddress is called and multicast addresses are set, the signal sent to the multicast addresses can be received.

The switch 43 of the connecting module 41 is equivalent to a concept of a method for starting and stopping a saving operation for an audio signal supplied from the NIC 19 to the HDD 13. When the saving operation for the audio signal to the HDD 13 is started, a save start method SaveStart is called from the AP. When the saving operation is stopped, a save stop method SaveStop is called from the AP. In other words, when the save start method SaveStart is called from the AP, the switch 43 is turned on. When the save stop method SaveStop is called from the AP, the switch 43 is turned off.

The audio signal supplied to the HDD 13 is saved. In addition, the audio signal supplied to the sound card 17 is reproduced. Since the switches 42 and 43 are disposed in parallel on the connecting module 41, the receiving operation, the reproducing-operation, and the saving operation can be independently and simultaneously performed.

Figure 11:
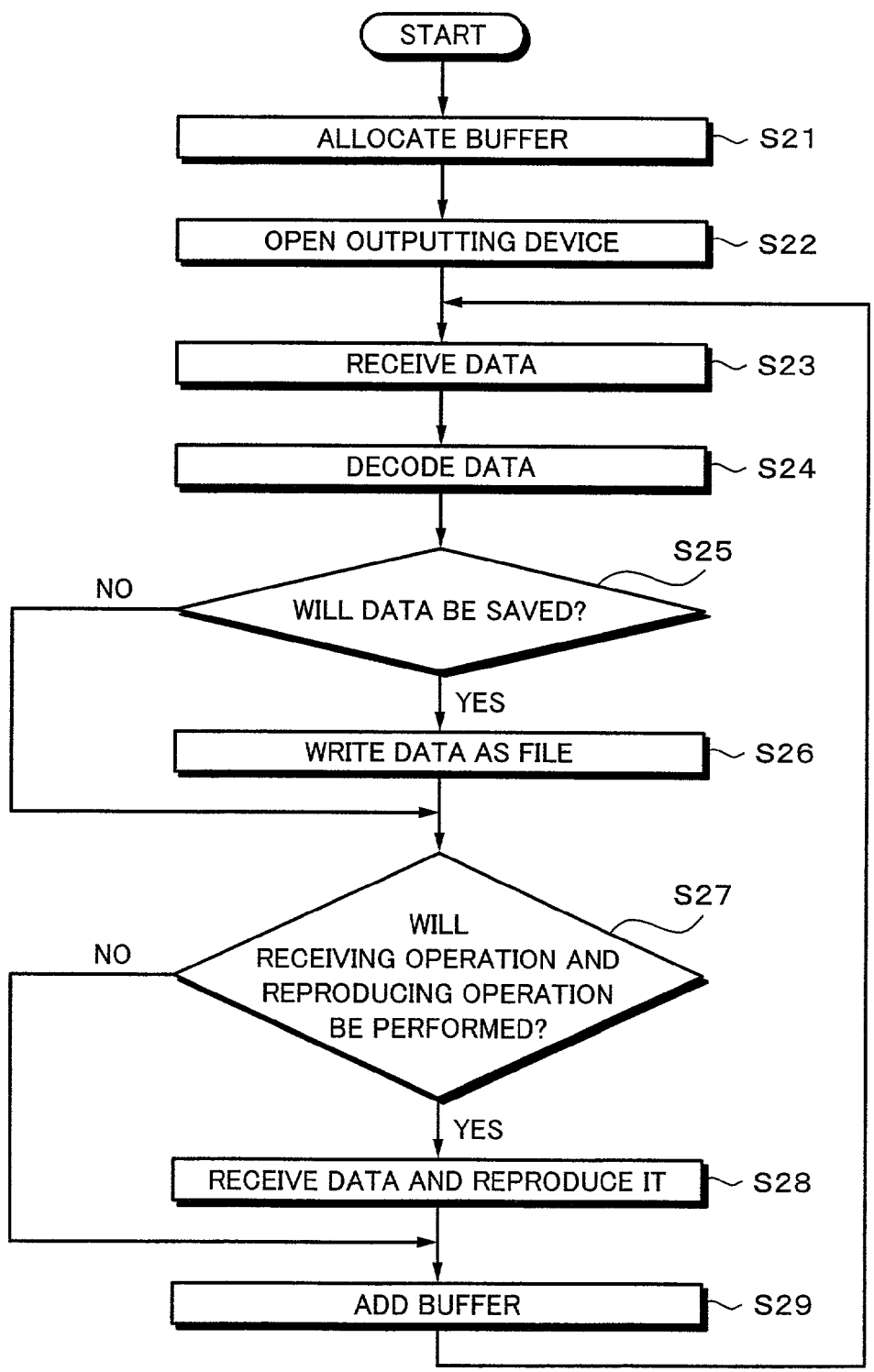
FIG. 11 is a flow chart for explaining the operation of the first example of the connecting module according to the second embodiment of the present invention.

Next, with reference to a flow chart shown in FIG. 11, the operation of the first example of the connecting module according to the second embodiment will be described. When the receive and reproduction start method (RecvStart) and/or the save start method (SaveStart) is called from the AP, the operation corresponding to the flow chart is started. First of all, a thread is generated. At step S21, a buffer that saves data is allocated and initialized. At that point, when the process speed of the CPU 11 is slow, to assure the sending operation in real time, the number of buffers is increased. At step S22, a device to which an audio signal is output is opened. When the receive and reproduction start method has been called, the switch 42 is turned on. The speaker, headphone, or the like is opened as a device to which the audio signal is output through the sound card 17. When the save start method has been called, the switch 43 is turned on. The HDD 13 is opened as a device to which the audio signal is output. At step S23, a thread for obtaining and processing the audio signal supplied from the opened device is generated. At step S24, whenever the buffer is filled with the audio signal, it is decoded.

At step S25, it is determined whether or not the method called from the AP is the save start method. When the determined result represents that the save start method has been called, the flow advances to step S26. When the determined result represents that the save start method has not been called, the flow advances to step S27. At step S26, the obtained signal is saved as a file to the HDD 13.

At step S27, it is determined whether or not the method called from the AP is the receive and reproduction start method. When the determined result represents that the receive and reproduction start method has been called, the flow advances to step S28. When the determined result represents that the send start method has not been called, the flow advances to step S29. At step S28, the obtained signal is reproduced. At step S29, a buffer is added. Thereafter, the flow returns to step S24.

When the receive and reproductions stop method (RecvStop) and/or the save stop method (SaveStop) is called from the AP, the receiving operation for the signal supplied from the device and the process therefor are stopped. In addition, the allocated buffers are unallocated.

Thus, while an audio signal received from the network 111 is being reproduced, the saving operation for the audio signal can be started and stopped without need to interrupt the reproducing operation. In addition, while an audio signal is being saved, the receiving operation and the reproducing operation can be started and stopped without need to interrupt the saving operation.

Figure 12:
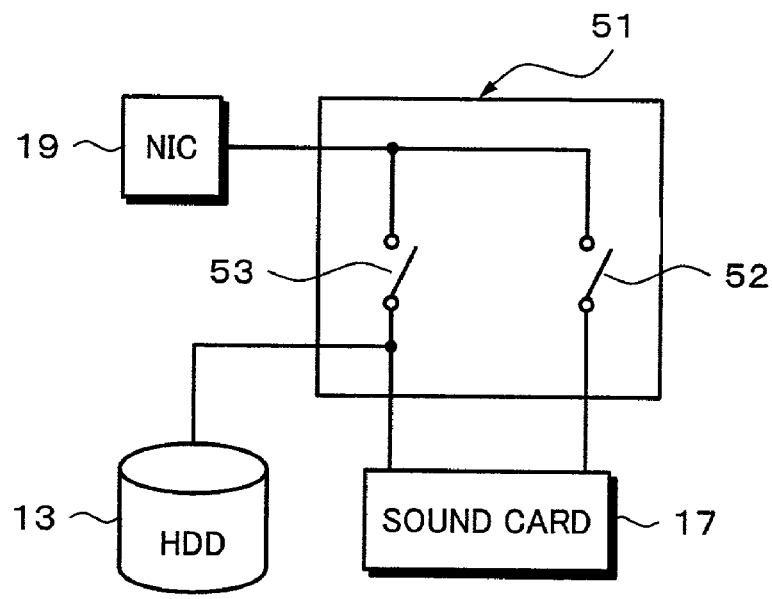
FIG. 12 is a schematic diagram for explaining a second example of the connecting module according to the second embodiment of the present invention.

FIG. 12 is a schematic diagram showing a second example of the connecting module according to the second embodiment. In FIG. 12, a connecting module 51 is disposed among an NIC 19, an HDD 13, and a sound card 17. Switches 52 and 53 are connected in parallel to the connecting module 51. In other words, an audio signal supplied from the NIC 19 is supplied to the sound card 17 through the switch 52. The audio signal is supplied to the HDD 13 and the sound card 17 through the switch 53.

In this example, the switch 52 of the connecting module 51 is equivalent to a concept of a method for starting and stopping a receiving operation and a reproducing operation of the sound card 17 for an audio signal supplied from the NIC 19. When an audio signal is received and reproduced, a receive and reproduction start method RecvStart is called from the AP. When the receiving operation and the reproducing operation are stopped, a receive and reproduction stop method RecvStop is called from the AP. In other words, when the receive and reproduction start method RecvStart is called from the AP, the switch 52 is turned on. When the receive and reproduction stop method RecvStop is called from the AP, the switch 52 is turned off. Before the audio signal is received, when a method SetMultiAddress is called and multicast addresses are set, a signal sent to the multicast addresses can be received.

The switch 53 of the connecting module 51 is equivalent to a concept of a method for starting and stopping a saving operation for an audio signal supplied from the NIC 19 to the HDD 13 and for starting and stopping a receiving operation and a reproducing operation of the sound card 17 for the audio signal. When the saving operation to the HDD 13 is started, a save start meted SaveStart is called from the AP. When the saving operation is stopped, a save stop method SaveStop is called from the AP. In other words, when the save start method SaveStart is called from the AP, the switch 53 is turned on. When the save stop method SaveStop is called from the AP, the switch 53 is turned off.

The audio signal supplied to the HDD 13 is saved. The audio signal supplied to the sound card 17 is reproduced. In such a manner, since the sound card 17 is connected to both the switches 52 and 53 of the connecting module 51, when a method is called from the AP, the audio signal supplied from the NIC 19 is received and reproduced.

Figure 13:
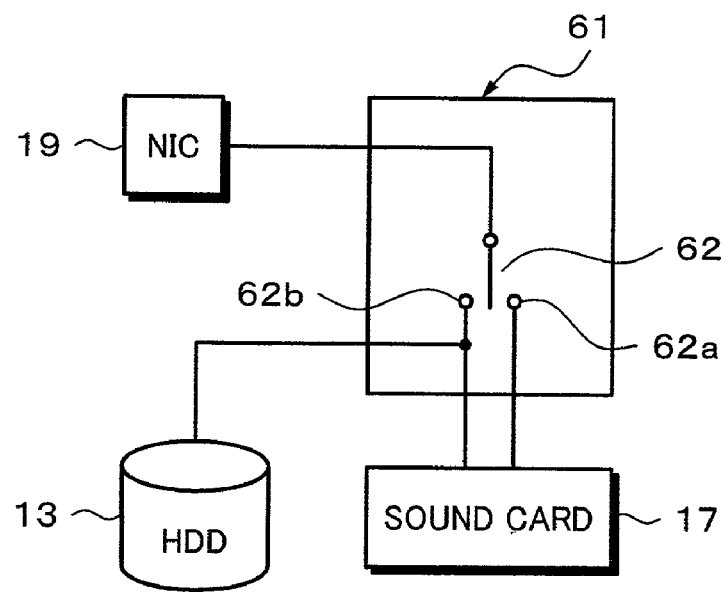
FIG. 13 is a schematic diagram for explaining a third example of the connecting module according to the second embodiment of the present invention.

FIG. 13 is a schematic diagram showing a third example of the connecting module according to the second embodiment. In the third example shown in FIG. 13, a connecting module 61 is disposed among an NIC 19, a HDD 13, and a sound card 17. In addition, a switch 62 is disposed on the connecting module 61. In other words, the switch 62 selects the HDD 13 or the sound card 17 to which an audio signal is supplied from the NIC 19.

The switch 62 is equivalent to a concept of a method for starting and stopping a saving operation for an audio signal supplied from the NIC 19 to the HDD 13 and for starting and stopping a receiving operation and a reproducing operation of the sound card 17 for the audio signal. When an audio signal is received and reproduced, a receive and reproduction start method RecvStart is called from the AP. When the reproducing operation and the reproducing operation are stopped, a receive and reproduction stop method RecvStop is called from the AP. In other words, when the receive and reproduction start method RecvStart is called from the AP, the switch 62 is connected to a terminal 62a. When the receive and reproduction stop method RecvStop is called from the AP, the switch 62 is disconnected from the terminal 62a. Before an audio signal is received, when a method SetMultiAddress is called and multicast addresses are set, a signal sent to the multicast addresses can be received.

When the saving operation to the HDD 13 is started, a save start method SaveStart is called from the AP. When the saving operation is stopped, a save stop method SaveStop is called from the AP. In other words, when the save start method SaveStart is called from the AP, the switch 62 is connected to a terminal 62b. When the save stop method SaveStop is called from the AP, the switch 62 is disconnected from the terminal 62b.

The audio signal supplied to the HDD 13 is saved. The audio signal supplied to the sound card 17 is reproduced. In such a manner, since the sound card 17 is connected to both the terminals 62a and 62b of the switch 62 in the connecting module 61, when a method is called from the AP, the audio signal supplied from the NIC 19 is received and reproduced.

Figure 4:
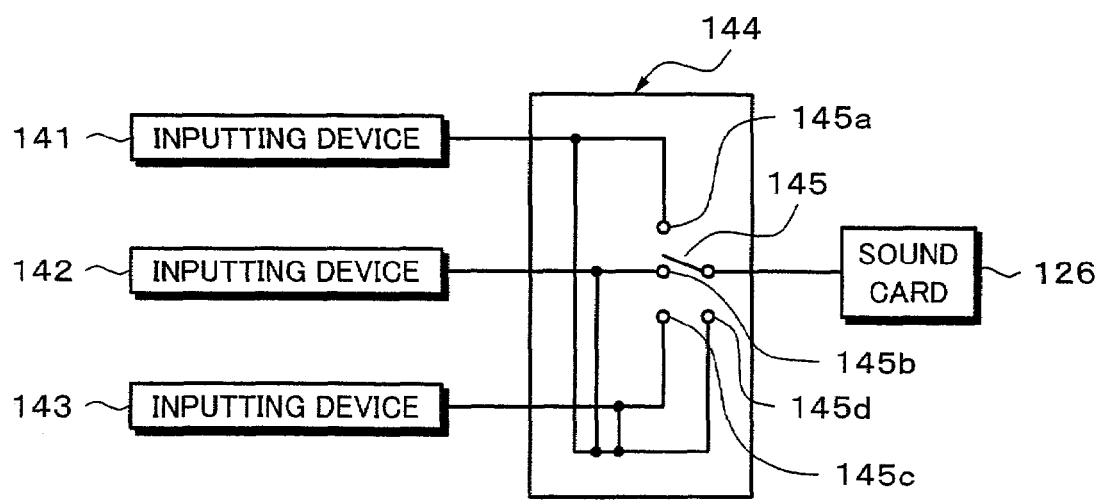
FIG. 4 is a block diagram for explaining a component type of a mixer type of a sound card.
Figure 14:
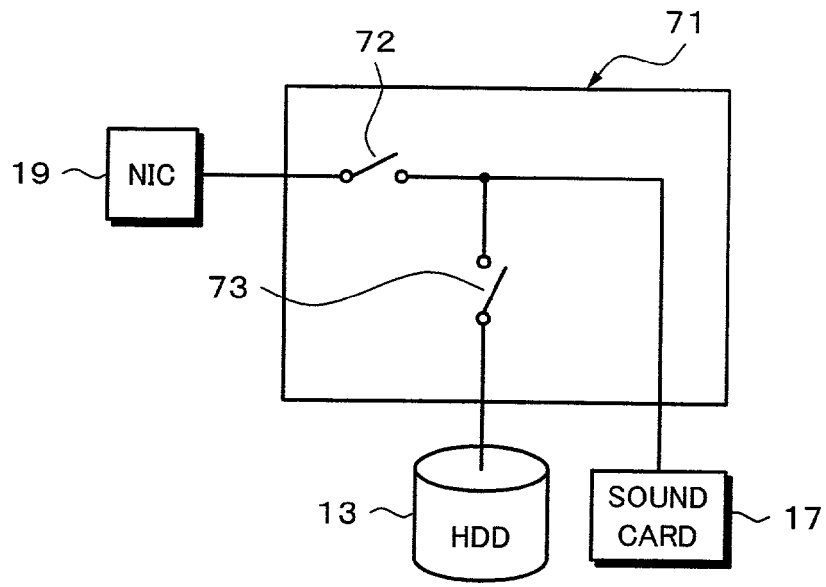
FIG. 14 is a schematic diagram for explaining a fourth embodiment of the connecting module according to the second embodiment of the present invention.

FIG. 14 is a schematic diagram showing a fourth example of the connecting module according to the second embodiment. In the fourth example shown in FIG. 4, a connecting module 71 is disposed among an NIC 19, a HDD 13, and a sound card 17. In addition, switches 72 and 73 are disposed in parallel on the connecting module 71. In other words, an audio signal supplied from the NIC 19 is supplied to the sound card 17 through the switch 72. In addition, the audio signal is supplied to the HDD 13 through the switches 72 and 73.

In this example, the switch 72 of the connecting module 71 is equivalent to a concept of a method for starting and stopping a receiving operation and a reproducing operation for an audio signal supplied from the NIC 19. When an audio signal is received and reproduced, a receive and reproduction start method RecvStart is called from the AP. When the receiving operation and the reproducing operation are stopped, a receive and reproduction stop method RecvStop is called from the AP. In other words, when the receive and reproduction start method RecvStart is called from the AP, the switch 72 is turned on. When the receive and reproduction stop method RecvStop is called for the AP, the switch 72 is turned off. Before an audio data is received, when a method SetMultiAddress is called and multicast addresses are set, a signal sent to the multicast addresses can be received.

The switch 73 of the connecting module 71 is equivalent to a concept of a method for starting and stopping a saving operation for an audio signal supplied from the NIC 19 to the HDD 13. When the saving operation to the HDD 13 is started, a save start method SaveStart is called from the AP. When the saving operation is stopped, a save stop method SaveStop is called from the AP. In other words, when the save start method SaveStart is called from the AP, the switches 72 and 73 are turned on. When the save stop method SaveStop is called from the AP, the switches 72 and 73 are turned off.

The audio signal supplied to the HDD 13 is saved. The audio signal supplied to the sound card 17 is reproduced. In such a manner, the sound card 17 is connected to the switch 72 of the connecting module 71. Thus, when a method is called from the AP, the audio signal supplied from the NIC 19 is received and reproduced.

In the fourth example of the connecting module, when the save start method SaveStart is called from the AP, the switches 72 and 73 are turned on. In this case, only the switch 73 may be turned on. At that point, to supply the audio signal to the HDD 13, the receive and reproduction start method RecvSart should have been called as a required condition. Thus, when the save stop method SaveStop is called, only the switch 73 is turned off.

Figure 15:
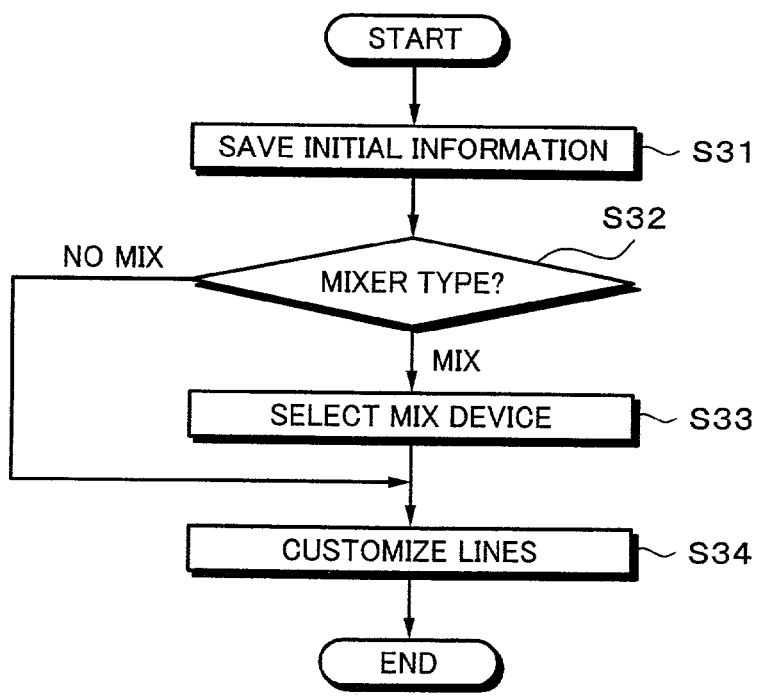
FIG. 15 is a flow chart for explaining an operation according to a third embodiment of the present invention.

Next, with reference to a flow chart shown in FIG. 15, an operation for detecting a component type of a mixer device according to a third embodiment of the present invention will be described. At step S31, a method for obtaining component types of all output lines and input lines of the PC shown in FIG. 5 and line IDs (identifiers) and for saving them is called from the AP. The method is for example MakelniFile. In other words, the method MakelniFile is called from the AP and initial information of component types and line IDs is saved.

At step S32, it is determined whether or not a mixer device of a sound card 17 has a MIX terminal. When the determined result represents that the mixer device has a MIX terminal, the flow advances to step S33. When the determined result represents that the mixer device does not have a MIX terminal, the flow advances to step S34. At step S33, the user is prompted to select a line name treated as a MIX terminal from an input line name list. The line name selected as the MIX terminal is saved to an information file. When the mixer device does not have a MIX terminal, data that represents that there is no line treated as a MIX terminal is saved to the information file.

At step S34, lines corresponding to individual component types are customized. For example, the user can select devices such as a microphone and a line to be controlled.

Figure 16:
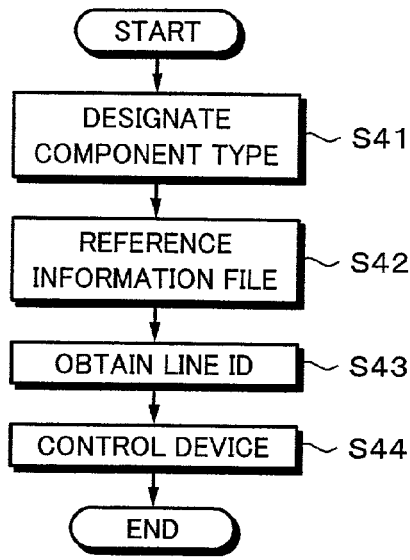
FIG. 16 is a flow chart for explaining the operation according to the third embodiment of the present invention.

Next, with reference to a flow chart shown in FIG. 16, an example of which devices are controlled corresponding to a saved information file will be described. At step S41, when each line is handled, a component type is designated thereto. At step S42, the saved information file is referenced. At step S43, a line ID is obtained. At step S44, the device corresponding to the obtained line ID is controlled so that the AP can perform an operation corresponding to the user's environment.

Figure 17:
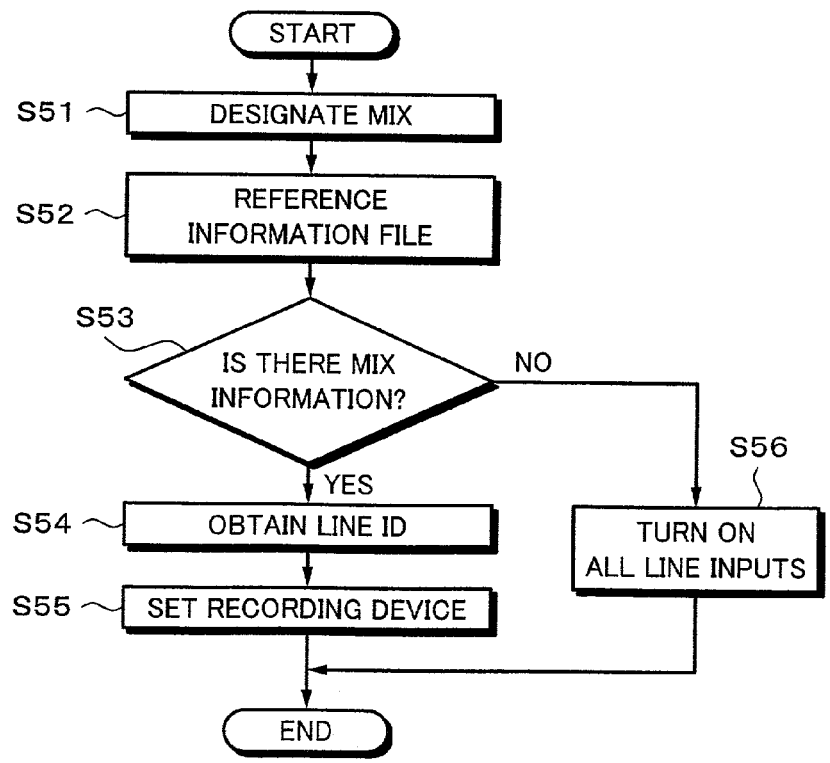
FIG. 17 is a flow chart for explaining the operation according to the third embodiment of the present invention.

Next, with reference to a flow chart shown in FIG. 17, an example of which a MIX signal is obtained will be described. At step S51, the MIX signal is designated. At step S52, a saved information file is referenced. At step S53, it is determined whether or not a line treated as a MIX terminal has been saved in the information file. When the determined result represents that there is a MIX terminal, the flow advances to step S54. When the determined result represents that there is no MIX terminal, the flow advances to step S56. At step S54, the line ID of the MIX terminal is obtained. At step S55, the obtained line is used. At step S56, all input lines are turned on.

Figure 18:
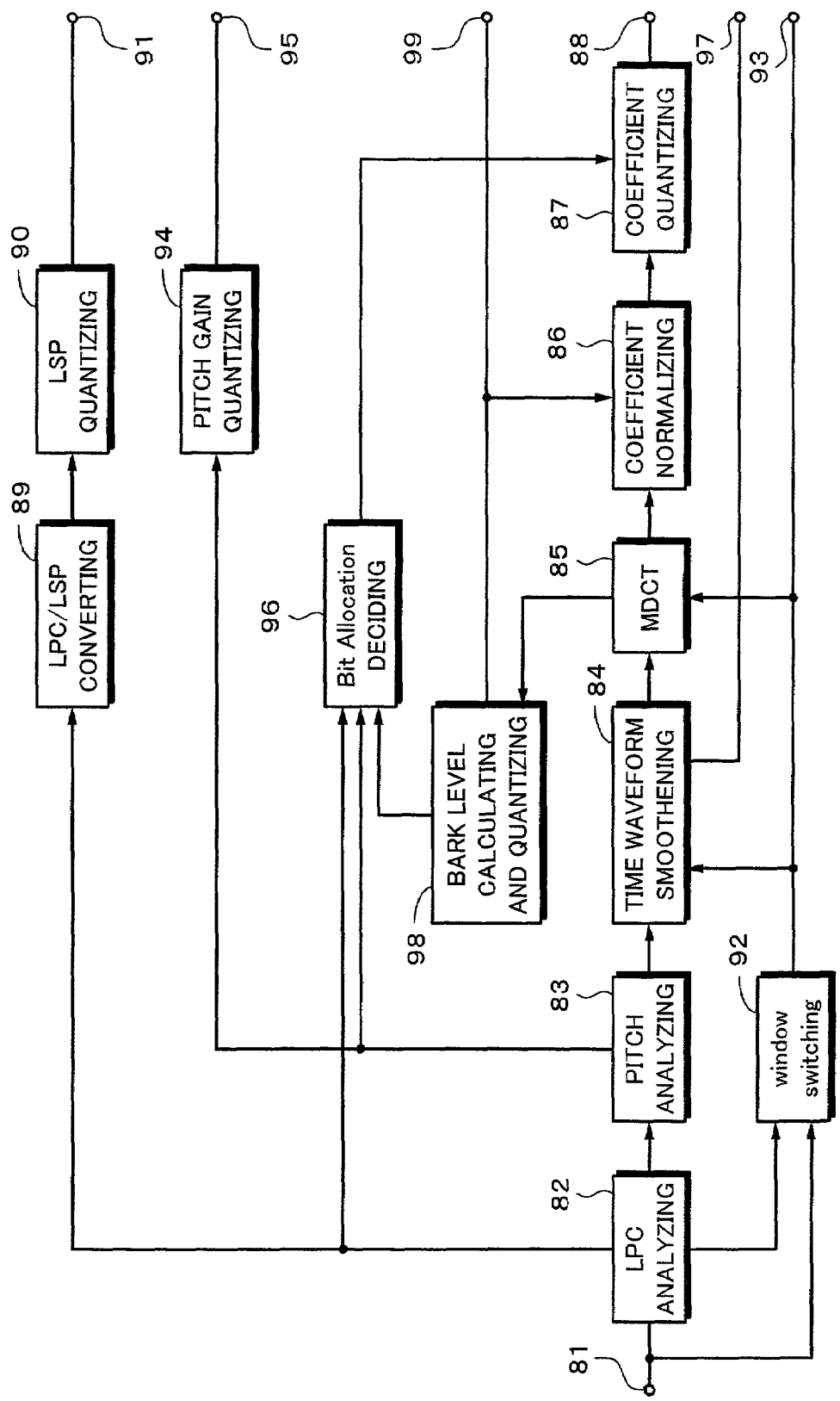
FIG. 18 is a block diagram showing an example of a coding process according to the present invention.

Next, with reference to FIG. 18, an example of an HAC (Hybrid Audio Coding) apparatus suitable for exchanging an audio signal through a network 111 will be described. The HAC apparatus shown in FIG. 18 a hybrid coding apparatus of which a speech processing technology and an audio processing technology are integrated. As a speech processing technology, LPC (Linear Prediction Coding), Pitch, or VQ (Vector Quantization) is used. As an audio processing technology, MDCT (Modified Discrete Cosine Transform) or window switching is used. The HAC coding apparatus outputs a coefficient of the time axis that is obtained by the speech process and a coefficient of the frequency axis that is obtained by the audio process.

An LPC analyzing circuit 82 analyzes a spectrum of the time axis from an audio signal supplied from an input terminal 81. An LPC/LSP (Line Spectrum Pair) converting circuit 89 converts the supplied spectrum into an LSP parameter. An LSP quantizing circuit 90 quantizes the LSP parameter. A pitch analyzing circuit 83 analyzes the pitch of the supplied audio signal. A pitch gain quantizing circuit 94 quantizes the pitch and the pitch gain. In such a manner, the coefficient of the time axis is output.

A window switching circuit 92 detects an optimum window from the supplied spectrum and the audio signal and sets a flag to the detected optimum window. A time waveform smoothing circuit 84, an MDCT circuit 85, a coefficient normalizing circuit 86, a coefficient quantizing circuit 87, a bit allocation deciding circuit 96, and a bark level calculating and quantizing circuit 98 obtain a quantized MDCT coefficient. In such a manner, the coefficient of the frequency axis is output.

According to the embodiment, using the HAC apparatus, an audio signal can be compressed to around 20 kbps per channel. However, any coding apparatus can be used as long as such a compression rate and real time process are assured.

Figure 1:
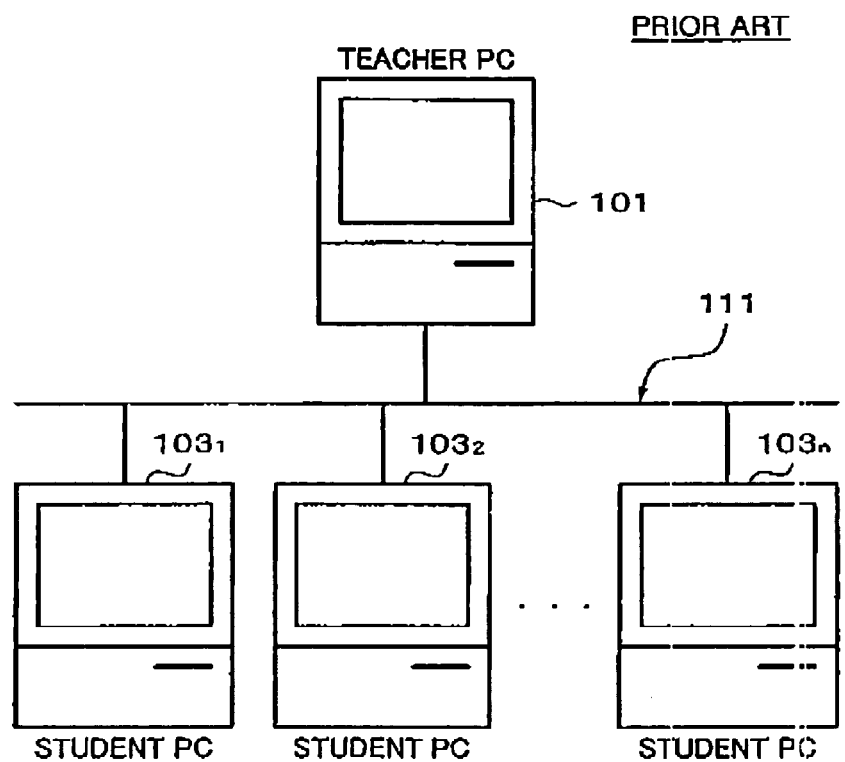
FIG. 1 is a block diagram for explaining a conventional system.
Figure 2:
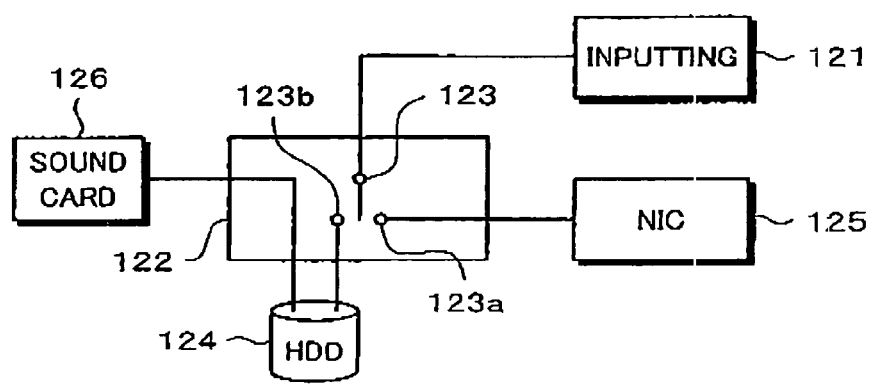
FIG. 2 is a schematic diagram for explaining a conventional connecting module.
Figure 3:
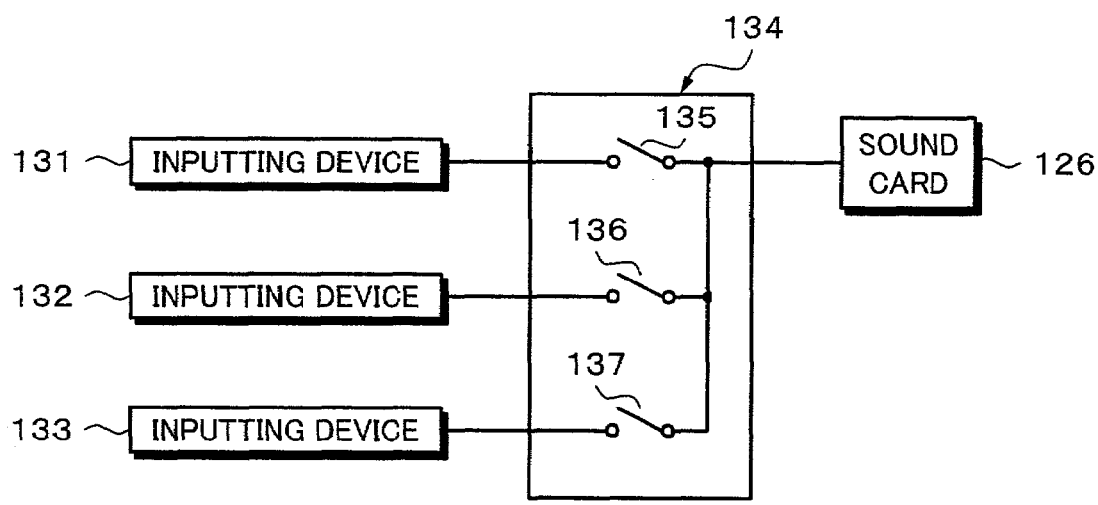
FIG. 3 is a block diagram for explaining a component type of a mixer type of a sound card.
Figure 19:
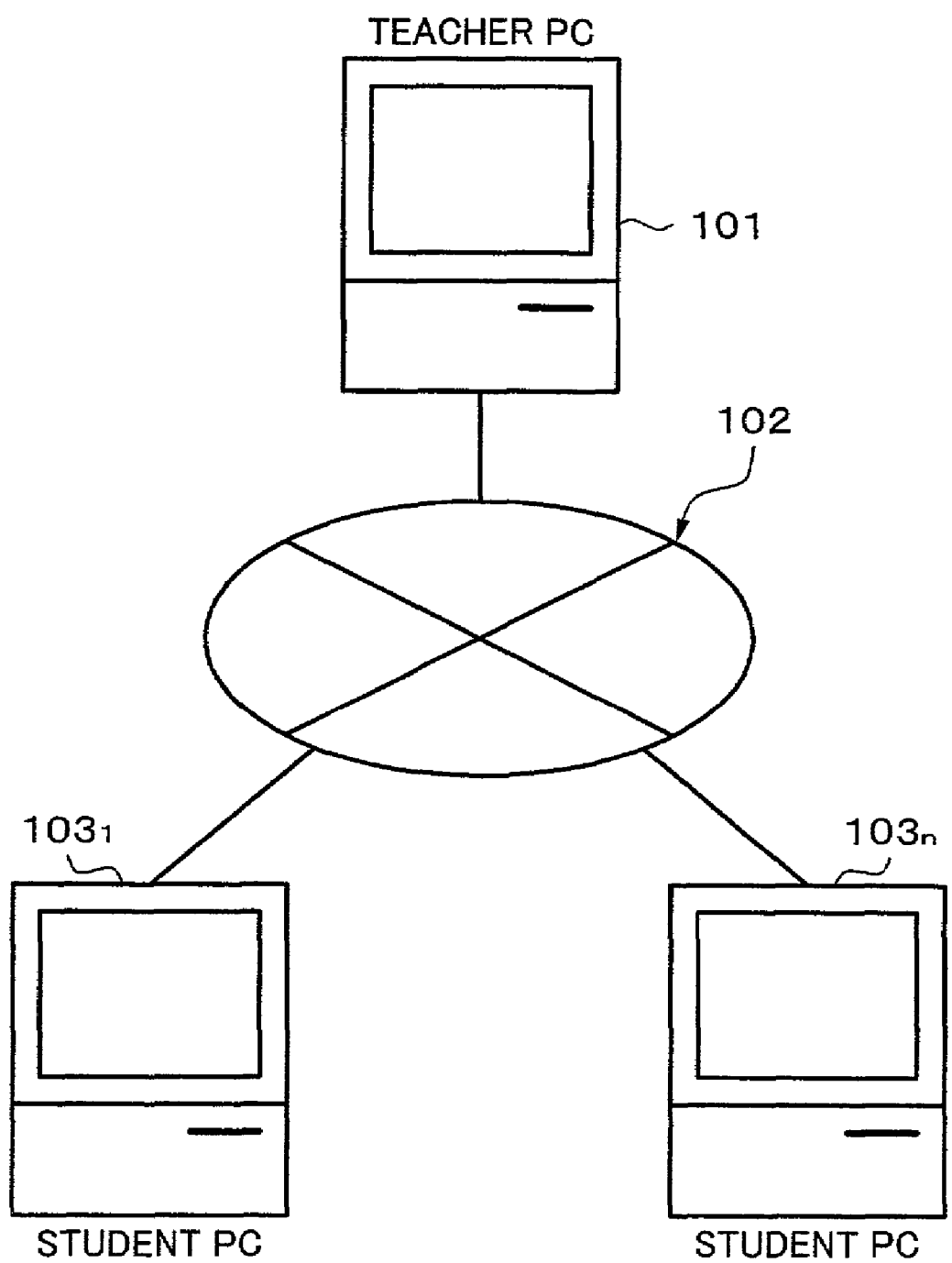
FIG. 19 is a schematic diagram showing an example of a system according to the present invention.

Although the embodiment is suitable for the system shown in FIG. 1, the embodiment can be applied to a system shown in FIG. 19. In FIG. 19, as an example of the network 111 that connects the teacher PC 101 and the student PC 103, so-called Internet 102 is used. At that point, each of the teacher PC 101 and the student PC 103 should be equipped with a communication function. Thus, the forgoing embodiment can be accomplished through the Internet 102.

FIG. 20 shows an example of which the network 111 is provided with a communication interface. A communication interface 112 composed of a router or the like is connected to a WWW (World Wide Web) server 113. The WWW server 113 can be connected to the Internet 102. As with the other student PCs $103_1$, $103_2$, ... $103_n$, the forgoing embodiment can be applied for a student PC $103_m$ connected to the Internet 102.

According to the forgoing embodiment, the Internet 102 is treated as an example of the network 111. However, it should be noted that the Internet 102 is just an example. The network 111 can be structured in any form. For example, the network 111 may be a telephone line. Alternatively, a CATV (Cable Television) network service or a cellular phone network service may be used. Of course, a dedicated line, a ground wave, or a satellite wave may be used. As a communicating method, a PtoP (Peer to Peer) that shares information by many users who are directly connected may be used.

The foregoing embodiment may be saved on a predetermined record medium for example a CD-ROM (Compact Disk—Read Only Memory) and installed to a PC. Alternatively, the forgoing embodiment may be installed to a PC through a transmission medium such as the network 111 or the Internet 102.

According to the present invention, even if a send start method, a send stop method, a save start, and/or a save stop method is called from a plurality of APs, a single module has a record medium saving function and a network sending function. Thus, a sending operation for an audio signal can be started and stopped without need to interrupt a saving operation for an audio signal. In addition, a saving operation can be started and stopped without need to interrupt a sending operation for an audio signal to the network. Likewise, even if a receive and reproduction start method, a receive and reproduction stop method, a save start method, and/or a save stop method is called, since one module has a recording function to a record medium, a receiving function, and a reproducing function, the reproducing operation can be started and stopped without need to interrupt the saving operation for an audio signal received from the network.

According to the present invention, when a plurality of APs installed to a PC control a device of the PC, since a called method is a single module, the device can be independently controlled without need to interrupt the control of the device. In other words, even if different methods are called from a plurality of APs, since each of the called methods is composed of a single module, the process executed by each method is not interrupted. Thus, a saving operation, a reproducing operation, a sending operation, and a receiving operation can be independently performed.

According to the present invention, since an information file for a mixer device can be automatically generated, after it is generated, the user can customize the information file. Since the customized information file can be freely referenced, regardless of the mixer device, inputs/outputs of a sound card can be controlled on an AP.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An audio signal saving operation controlling method for causing an application program to simultaneously control a sending operation and a saving operation for an audio signal between a teacher computer and at least one student computer connected to a network, the application program being installed on the teacher computer and the student computer which are both equipped with a sound card, a record medium, and a network interface card, the method comprising the steps of:

starting the sending operation for sending the audio signal from said student computer to the teacher computer via the network, when a send start method for starting the sending operation for said audio signal is called from the application program;

stopping the sending operation for said audio signal from said student computer to the teacher computer, when a send stop method for stopping the sending operation for said audio signal is called from the application program;

starting the saving operation for said audio signal to the record medium in the student computer, when a save start method for starting the saving operation for said audio signal to the record medium is called from the application program; and stopping the saving operation for said audio signal to the record medium in the student computer, when a save stop method for stopping the saving operation for said audio signal to the record medium is called from the application program, wherein said audio signal is saved to the record medium in the student computer without need to interrupt the sending operation for said audio signal from the student computer to the teacher computer, wherein said audio signal is sent from the student computer to the teacher computer without need to interrupt the saving operation for said audio signal to the record medium in the student computer, wherein an information file for a mixer device is automatically generated, and after it is generated, a user can customize the information file, and wherein the sending operation uses hybrid audio coding including a bark level calculating and quantizing circuit operable on a modified discrete transform of pitch from said audio signal to output a coefficient of a time axis that is obtained by a speech process and a coefficient of a frequency axis that is obtained by an audio process.

2. The audio signal saving operation controlling method as set forth in claim 1, wherein the application program that calls the send start method and the send stop method is installed on a different computer from the application program that calls the save start method and the save stop method.

3. An audio signal reproducing operation controlling method for causing an application program to simultaneously control a receiving operation, a reproducing operation, and a saving operation for an audio signal between a teacher computer and at least one student computer connected to a network, the application program being installed on the teacher computer and the student computer which are both equipped with a sound card, a record medium, and a network interface card, the method comprising the steps of:

starting the receiving operation and the reproducing operation for the audio signal in the student computer, when a receive and reproduction start method for starting the receiving operation and the reproducing operation for the audio signal is called from the application program;

stopping the receiving operation and the reproducing operation for the audio signal in the student computer, when a receive and reproduction stop method for stopping the receiving operation and the reproducing operation for the audio signal is called from the application program;

starting the saving operation for the audio signal to the record medium in the student computer, when a save start method for starting the saving operation for the audio signal to the record medium is called from the application program; and stopping the saving operation for the audio signal to the record medium in the student computer, when a save stop method for stopping the saving operation for the audio signal to the record medium is called from the application program, saving the audio signal to the record medium in the student computer without need to interrupt the receiving operation and the reproducing operation in the student computer for the audio signal, receiving and reproducing the audio signal without need to interrupt the saving operation for the audio signal to the record medium in the student computer, generating an information file that is customizable after it is generated, and wherein the audio signal was encoded using a hybrid audio coding including bark level calculating and quantizing of a modified discrete transform of pitch from said audio signal to encode a coefficient of a time axis that was obtained by a speech process and a coefficient of a frequency axis that was obtained by an audio process.

4. The audio signal reproducing operation controlling method as set forth in claim 3, wherein the application program that calls the receive and reproduction start method and the receive and reproduction stop method is installed on a different computer from the application program that calls the save start method and the save stop method.

5. The audio signal reproducing operation controlling method as set forth in claim 3, wherein the save start method starts the saving operation for the audio signal to the record medium in the student computer and starts the receiving operation and the reproducing operation for the audio signal in the student computer.

6. An audio signal saving operation controlling program for causing an application program to simultaneously control a sending operation and a saving operation for an audio signal between a teacher computer and at least one student computer connected to a network, the application program being installed on the teacher computer and the student computer which are both equipped with a sound card, a record medium, and a network interface card, the controlling program comprising:

means for starting the sending operation for sending the audio signal from said student computer to the teacher computer via the network, when a send start method for starting the sending operation for said audio signal is called from the application program;

means for stopping the sending operation for said audio signal from said student computer to the teacher computer, when a send stop method for stopping the sending operation for said audio signal is called from the application program;

means for starting the saving operation for said audio signal to the record medium in the student computer, when a save start method for starting the saving operation for said audio signal to the record medium is called from the application program; and means for stopping the saving operation for said audio signal to the record medium in the student computer, when a save stop method for stopping the saving operation for said audio signal to the record medium is called from the application program, wherein said audio signal is saved to the record medium in the student computer without need to interrupt the sending operation for said audio signal from the student computer to the teacher computer, wherein said audio signal is sent from the student computer to the teacher computer without need to interrupt the saving operation for said audio signal to the record medium in the student computer, wherein an information file for a mixer device is automatically generated, and after it is generated, a user can customize the information file, and wherein the sending operation uses hybrid audio coding including a bark level calculating and quantizing circuit operable on a modified discrete transform of pitch from said audio signal to output a coefficient of a time axis that is obtained by a speech process and a coefficient of a frequency axis that is obtained by an audio process.

7. The audio signal saving operation controlling program as set forth in claim 6, wherein the application program that calls the send start method and the send stop method is installed on a different computer from the application program that calls the save start method and the save stop method.

8. An audio signal reproducing operation controlling program for causing an application program to simultaneously control a receiving operation, a reproducing operation, and a saving operation for an audio signal between a teacher computer and at least one student computer connected to a network, the application program being installed on the teacher computer and the student computer which are both equipped with a sound card, a record medium, and a network interface card, the controlling program comprising:

means for starting the receiving operation and the reproducing operation for the audio signal in the student computer, when a receive and reproduction start method for starting the receiving operation and the reproducing operation for the audio signal is called from the application program;

means for stopping the receiving operation and the reproducing operation for the audio signal in the student computer, when a receive and reproduction stop method for stopping the receiving operation and the reproducing operation for the audio signal is called from the application program;

means for starting the saving operation for the audio signal to the record medium in the student computer, when a save start method for starting the saving operation for the audio signal to the record medium is called from the application program; and means for stopping the saving operation for the audio signal to the record medium in the student computer, when a save stop method for stopping the saving operation for the audio signal to the record medium is called from the application program, wherein the audio signal is saved to the record medium in the student computer without need to interrupt the receiving operation and the reproducing operation in the student computer for the audio signal, wherein the audio signal is received and reproduced without need to interrupt the saving operation for the audio signal to the record medium in the student computer, wherein an information file for a mixer device is automatically generated, and after it is generated, a user can customize the information file, and wherein the audio signal was encoded using a hybrid audio coding including a bark level calculating and quantizing circuit operable on a modified discrete transform of pitch from said audio signal to encode a coefficient of a time axis that was obtained by a speech process and a coefficient of a frequency axis that was obtained by an audio process.

9. The audio signal reproducing operation controlling program as set forth in claim 8, wherein the application program that calls the receive and reproduction start method and the receive and reproduction stop method is installed on a different computer from the application program that calls the save start method and the save stop method.

10. The audio signal reproducing operation controlling program as set forth in claim 8, wherein the save start method starts the saving operation for the audio signal to the record medium in the student computer and starts the receiving operation and the reproducing operation for the audio signal in the student computer.

11. A record medium on which an audio signal saving operation controlling program has been recorded, the controlling program causing an application program to simultaneously control a sending operation and a saving operation for an audio signal between a teacher computer and at least one student computer connected to a network, the application program being installed on the teacher computer and the student computer which are both equipped with a sound card, a record medium and a network interface card, the controlling program comprising:

means for starting the sending operation for sending the audio signal from said student computer to the teacher computer via the network, when a send start method for starting the sending operation for said audio signal is called from the application program;

means for stopping the sending operation for said audio signal from said student computer to the teacher computer, when a send stop method for stopping the sending operation for said audio signal is called from the application program;

means for starting the saving operation for said audio signal to the record medium in the student computer, when a save start method for starting the saving operation for said audio signal to the record medium is said student computer is called from the application program; and means for stopping the saving operation for the audio signal to the record medium in the student computer, when a save stop method for stopping the saving operation for said audio signal to the record medium in said student computer is called from the application program, wherein said audio signal is saved to the record medium in the student computer without need to interrupt the sending operation for said audio signal from the student computer to the teacher computer, wherein said audio signal is sent from the student computer to the teacher computer without need to interrupt the saving operation for said audio signal to the record medium in the student computer, wherein an information file for a mixer device is automatically generated, and after it is generated, a user can customize the information file, and wherein the sending operation uses hybrid audio coding including bark level calculating and quantizing operable on a modified discrete transform of pitch from said audio signal to output a coefficient of a time axis that is obtained by a speech process and a coefficient of a frequency axis that is obtained by an audio process.

12. The record medium as set forth in claim 11, wherein the application program that calls the send start method and the send stop method is installed on a different computer from the application program that calls the save start method and the save stop method.

13. A record medium on which an audio signal reproducing operation controlling program has been saved, the controlling program causing an application program to simultaneously control a receiving operation, a reproducing operation, and a saving operation for an audio signal between a teacher computer and at least one student computer connected to a network, the application program being installed on the teacher computer and the student computer which are both equipped with a sound card, a record medium, and a network interface card, the controlling program comprising:

means for starting the receiving operation and the reproducing operation for the audio signal in the student computer, when a receive and reproduction start method for starting the receiving operation and the reproducing operation for the audio signal is called from the application program;

means for stopping the receiving operation and the reproducing operation for the audio signal in the student computer, when a receive and reproduction stop method for stopping the receiving operation and the reproducing operation for the audio signal is called from the application program;

means for starting the saving operation for the audio signal to the record medium in the student computer, when a save start method for starting the saving operation for the audio signal to the record medium is called from the application program; and means for stopping the saving operation for the audio signal to the record medium in the student computer, when a save stop method for stopping the saving operation for the audio signal to the record medium is called from the application program, wherein the audio signal is saved to the record medium in the student computer without need to interrupt the receiving operation and the reproducing operation in the student computer for the audio signal, wherein the audio signal is received and reproduced without need to interrupt the saving operation for the audio signal to the record medium in the student computer, wherein an information file for a mixer device is automatically generated, and after it is generated, a user can customize the information file, and wherein the audio signal was encoded using a hybrid audio coding including bark level calculating and quantizing operable on a modified discrete transform of pitch from said audio signal to encode a coefficient of a time axis that was obtained by a speech process and a coefficient of a frequency axis that was obtained by an audio process.

14. The record medium as set forth in claim 13, wherein the application program that calls the receive and reproduction start method and the receive and reproduction stop method is installed on a different computer from the application program that calls the save start method and the save stop method.

15. The record medium as set forth in claim 13, wherein the save start method starts the saving operation for the audio signal to the record medium in the student computer and starts the receiving operation and the reproducing operation for the audio signal in the student computer.

* * * * *